(12) United States Patent
Herbst et al.

(10) Patent No.: US 10,711,714 B2
(45) Date of Patent: Jul. 14, 2020

(54) METHOD FOR OPERATING AN INTERNAL COMBUSTION ENGINE

(71) Applicant: AVL LIST GMBH, Graz (AT)

(72) Inventors: Martin Herbst, Graz (AT); Bernhard Breitegger, Lieboch (AT); Erwin Schalk, Graz (AT)

(73) Assignee: AVL List GmbH, Graz, UT (US)

( * ) Notice: Subject to any disclaimer, the term of this patent is extended or adjusted under 35 U.S.C. 154(b) by 270 days.

(21) Appl. No.: 15/742,647

(22) PCT Filed: Jul. 7, 2016

(86) PCT No.: PCT/AT2016/050243
§ 371 (c)(1),
(2) Date: Jan. 8, 2018

(87) PCT Pub. No.: WO2017/004647
PCT Pub. Date: Jan. 12, 2017

(65) Prior Publication Data
US 2018/0202373 A1 Jul. 19, 2018

(30) Foreign Application Priority Data
Jul. 8, 2015 (AT) .................................. A 446/2015

(51) Int. Cl.
*F02D 41/00* (2006.01)
*F02D 41/14* (2006.01)
*F02D 43/00* (2006.01)

(52) U.S. Cl.
CPC ....... *F02D 41/005* (2013.01); *F02D 41/1444* (2013.01); *F02D 41/1445* (2013.01);
(Continued)

(58) Field of Classification Search
CPC ............... F02D 41/005; F02D 41/1444; F02D 41/1445; F02D 41/1447; F02D 41/1462;
(Continued)

(56) References Cited

U.S. PATENT DOCUMENTS 6,453,666 B1 9/2002 Surnilla et al.
2013/0131967 A1 5/2013 Yu et al.
(Continued)

FOREIGN PATENT DOCUMENTS

AU 2014201207 3/2014
WO 9925965 5/1999

*Primary Examiner* — Audrey K Bradley
*Assistant Examiner* — Dapinder Singh
(74) *Attorney, Agent, or Firm* — Dykema Gossett PLLC

(57) ABSTRACT

The invention relates to a method for operating an internal combustion engine during any driving operation and in particular during a defined testing cycle which determines compliance with regulations. The internal combustion engine has at least one exhaust gas aftertreatment device with an adjustable degree of efficiency (for example by changing the reduction agent) or an exhaust gas recirculation device or alternative variables for changing the raw engine emissions. At least one monitoring window is assigned to the active profile. The aim of the invention is to allow strict exhaust gas regulations to be met in particular during real driving operations while simultaneously allowing a low fuel consumption. This is achieved in that at least one main monitoring window of the driving profile and a sub-monitoring window (F2) with a starting point and an end point are defined within a driving profile or test cycle. During the sub-monitoring window (F2), a predictive and quantitative estimation of at least one observed emission (E) for the main monitoring window F3 is carried out before reaching the end point of another main monitoring window F3, and the estimated emission quantity is compared with a defined maximum emission quantity. In the event of a large devia- (Continued)

Figure 1:
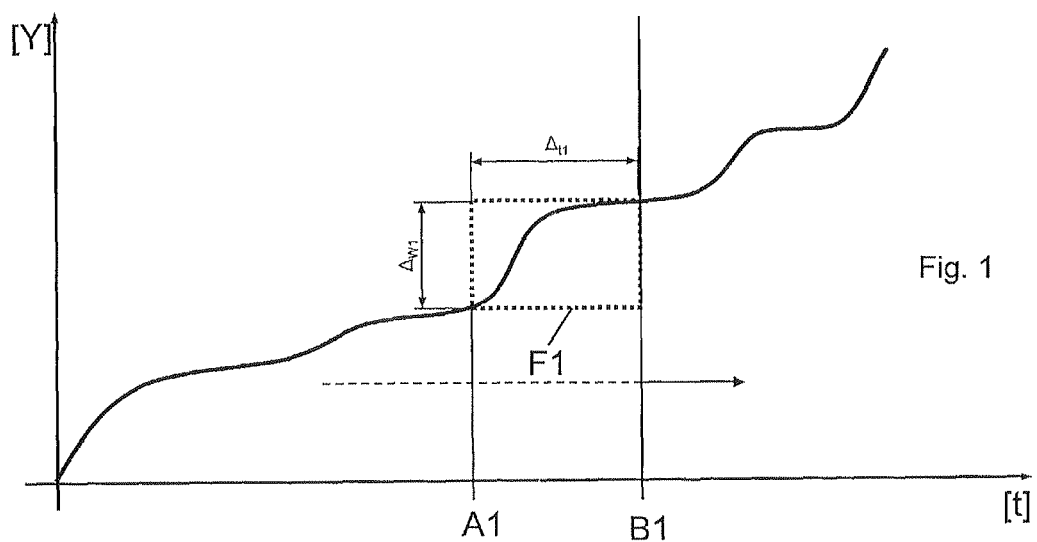

tion of the maximum emission quantity, at least one control parameter of the internal combustion engine or the exhaust gas aftertreatment process is adaptively modified such that the quantity of the monitored emission (E) approximates the specified target value as much as possible and the consumption of operating resources is optimized.

15 Claims, 3 Drawing Sheets

(52) U.S. Cl.
 CPC ..... *F02D 41/1447* (2013.01); *F02D 41/1462* (2013.01); *F02D 41/1475* (2013.01); *F02D 43/00* (2013.01); *F02D 2200/08* (2013.01); *F02D 2200/10* (2013.01); *F02D 2250/36* (2013.01); *Y02T 10/47* (2013.01)

(58) Field of Classification Search
 CPC .. F02D 41/1475; F02D 41/14; F02D 41/1438; F02D 41/1446; F02D 41/146; F02D 41/1461; F02D 43/00; F02D 2200/08; F02D 2200/10; F02D 2200/02; F02D 2250/36; F01N 11/00; F01N 3/02; F01N 3/08; F01N 9/00; Y02T 10/47; Y02T 10/42; Y02T 10/40; Y02T 10/54; Y02T 10/52; Y02T 10/50; Y02T 10/44; Y02T 10/20
 USPC ................................. 60/274, 277, 286, 295
 See application file for complete search history.

(56) References Cited

U.S. PATENT DOCUMENTS

| | | | |
|---|---|---|---|
| 2014/0156175 A1* | 6/2014 | Young | B60W 30/182 701/110 |
| 2016/0101699 A1* | 4/2016 | Wolff | B60L 7/20 290/31 |

* cited by examiner

METHOD FOR OPERATING AN INTERNAL COMBUSTION ENGINE

The invention relates to a method for operating an internal combustion engine during a defined cycle, wherein the engine raw emissions of the internal combustion engine are adjustable via at least one emission control parameter and wherein the cycle is assigned at least one monitoring window with a starting and endpoint. The cycle may be any drive mode cycle or defined legal cycle.

Typically, engine emissions for a point downstream of an exhaust aftertreatment device are adjusted to meet regulatory emissions in a specified test cycle, such as WHTC (WHTC=World Harmonized Transient Cycle) for EURO 6 commercial vehicles. The EURO 6 emission standard for commercial vehicles stipulates that vehicles can be checked for compliance with and the maintenance of legal regulations not only in the specified test cycle but also during the entire period of use in real driving conditions. In this case, vehicles in use are examined in the so-called PEMS cycle (Portable Emission Measurement System) on standardized routes for so-called RDE (Real Driving Emissions). The standard engine calibration for the legal cycle must also cover these requirements for RDE. In this case, entire emission calibration datasets are usually switched between the extremes for best consumption with higher emissions and higher consumption with lowest emissions over several stages dependent on the operating point. Thus, in previous strategies, a pure switchover between characteristic maps of different conditions usually takes place, which is based primarily on the current engine operating point and the temperatures of exhaust aftertreatment devices.

The disadvantage is that the operation with the lowest emissions in many operating points depending on the observed emission can entail higher fuel consumption. Good fuel consumption values and therefore low $CO_2$ emissions produce higher $NO_x$ values for example, since reduced exhaust gas recirculation is used for example, wherein consumption values increase if the amount of recirculated exhaust gas is increased in order to reduce $NO_x$ emissions.

It is the object of the invention to ensure compliance with strict exhaust laws in real driving operation whilst maintaining low consumption of fuel or operating resources at the same time.

This is achieved according to the invention in such a way that within a first monitoring window of the cycle with a first starting point and a first endpoint, at the time of the first endpoint at least one sub-monitoring window having a partial window starting point lying before the first endpoint and having a sub-window endpoint coinciding with the first endpoint is defined, wherein a predictive and quantitative estimation of at least one observed emission amount for the second monitoring window is performed on the basis of an emission amount of the sub-monitoring window before reaching the second endpoint of a second monitoring window whose second starting point lies before the first endpoint, and the estimated emission amount for the second monitoring window is compared with a defined maximum emission amount, and wherein upon reaching or exceeding the maximum emission amount at least one emission control parameter of the internal combustion engine is adaptively changed so that the amount of the observed emission is lowered.

Thus, estimated emission amounts can be compared for example with the legally defined maximum emission amount, wherein at least one control parameter and/or a calibration variable or an emission control parameter of the internal combustion engine or the exhaust aftertreatment system is adaptively changed upon falling below or exceeding the maximum emission amount so that the consumption of fuel or operating resources is kept as low as possible under the boundary condition that the amount of the observed emissions is within the target range.

The considered emissions may be $NO_x$ emissions, for example. The monitoring and sub-monitoring windows are defined as a period with starting and end times. The end times depend on reaching the given window values, e.g. cumulative power. A window therefore starts for example with a value of zero for the total power and the endpoint is defined as the value of the cumulative total power. Other values, e.g. kilometers traveled, fuel consumption and the like, can be used as determination values for the size of the sub-monitoring windows.

For example, the cycle may be a regulatory compliance test cycle, but other cycles relevant to general operation, such as operating time or ignition number cycles, may also be used in the method of the present invention.

The invention makes it possible, before the completion of a second monitoring window based on the result of the sub-monitoring window, to make an estimation as to whether required emission values are reached and to readjust the exhaust gas recirculation rate or metered amount as well as other influencing variables. This also allows for operation optimized within the applicable limits during normal operation and, in particular, in dynamic operation. Emission control parameters in the context of the invention are thus for example exhaust gas recirculation rate of an (internal or external) exhaust gas recirculation system, metered amount of an exhaust gas aftertreatment system ("Engine Aftertreatment System", EAS), throttle position or other.

In order to keep the fuel consumption low despite compliance with the statutory emission limit values, it is advantageous if the selected emission control parameters of the internal combustion engine (e.g. also of the EAS) are adaptively changed so that at the endpoint of the observed second monitoring window, a cumulative value for the amount of the observed emission is below a defined limit. In one variant of the invention, the control parameter is, for example, the exhaust gas recirculation rate of an internal or external exhaust gas recirculation system or the metered amount of the existing exhaust gas aftertreatment system.

In one variant of the invention, the emission control parameter concerns at least one of the following group: exhaust gas recirculation rate of an internal or external exhaust gas recirculation system, metered amount of reducing agent or fuel, injection quantity of reducing agent or fuel, air mass, injection timing, rail pressure of an injection system, metering for an existing exhaust aftertreatment system.

Preferably, the estimation of the amount of the observed emission as a function of at least one current operating parameter of the internal combustion engine is carried out from the group of engine power, engine speed, torque, engine load, exhaust gas mass flow and concentration of the observed emission value in the tailpipe of the exhaust pipe and the exhaust gas temperature.

In order to enable a rapid and most accurate estimation of the amount of the observed emissions it is provided in the context of the invention that—based on the current operating parameters—after reaching at least a defined minimum temperature of the internal combustion engine or the exhaust aftertreatment device or after a defined time window, at least one first monitoring window, preferably several monitoring windows and/or sub-monitoring windows at defined time intervals, and in each case the associated amount of the considered cumulative specific emissions within the monitoring window are calculated.

Parallel to this, according to one variant of the invention—based on the current operating parameter—after reaching at least one defined minimum temperature of the internal combustion engine or the exhaust aftertreatment device or after the expiration of a defined time window, at least one sub-monitoring window within the monitoring window and in each case the associated amount of the observed cumulative specific emissions within of the sub-monitoring window are calculated, wherein the sub-monitoring window is smaller than the associated first monitoring window. Preferably, the beginning of the sub-monitoring window corresponds to the beginning of the second monitoring window and at the same time the end of the sub-monitoring window corresponds to the end of the first monitoring window. In one variant, the partial window endpoint of the sub-monitoring window corresponds to the first endpoint of the first monitoring window. The height $\Delta_{W2}$ of the sub-monitoring window can be calculated freely and is, for example, 50 percent of the height $\Delta_{W1}$ of the first monitoring window.

Depending on the result of the estimation of the emissions at the end of the sub-monitoring window, at least one emission control parameter is changed, if necessary, in such a way that at the end of the future main monitoring window or second monitoring window, a value for the cumulative emissions can be achieved which lies below the legal requirements.

Advantageously, before a change in the control parameters is actually performed, the validity of the monitoring windows is continuously checked by checking one or more of the values of power level, window length, window work, amount of specific emissions, average window power. In case of anomaly, the validity of this window is negated and the calculations continue for new monitoring windows and/or sub-monitoring windows. Valid and invalid windows are recorded statically. In other words, the number of abnormal (i.e. the negated) and not abnormal (i.e. the non-negated) monitoring windows is conveniently recorded statistically.

According to one variant of the invention, the data are read out within a monitoring window until a desired cumulative work has been achieved. The results of the readout process are: window validity, window emissions, window length, cumulative work and cumulative emissions.

The control of the internal combustion engine and the exhaust aftertreatment device for compliance with legal regulations with respect to the RDE (Real Driving Emissions) takes place permanently and in real time on the basis of a calculation of the current emission levels in g/kWh for example without having to consider the entire issue history, as in a conventional emission integrator. This calculation is done by means of window evaluation, wherein length, validity and time vary. Thus, a much more precise control than before is possible and the permitted emission range can be better utilized. In addition, a cycle evaluation is already carried out during the test drive and all emission-relevant values are determined, and a statistical evaluation of the calculated windows is performed (see FIG. 3 for example). This eliminates the hitherto customary subsequent and tedious calculation of the cycle results, since these are already available at the end of the test run.

Based on the current engine speed, the torque, the $NO_x$ concentration in the exhaust tailpipe (downstream of the exhaust aftertreatment device) and the exhaust gas temperature, after taking into account the sensor delay and an averaging of the input values measured with higher time resolution (for example with a temporal resolution of 10 ms), the cumulative $NO_x$ mass (in [g]) and the cumulative power or energy (in [kWs]) are calculated every second and stored in a buffer. Based on this data, after reaching a certain engine or exhaust gas temperature or after the expiration of a time window, the main and sub-monitoring windows and the associated cumulative $NO_x$ mass emissions are calculated every second, as a result of which the specific $NO_x$ in (in [g/kWh]) is obtained for the respective window. In contrast to emissions from passenger cars, emissions are not expressed in g/km but in g/kWh for commercial vehicles. Both the window length and the starting time of these windows change dynamically, since a constant integral window power, mileage, work or the like is always calculated in real time depending on the variable engine power, based on the speed and load profile. In parallel, the same calculation is additionally carried out for a freely configurable (e.g. 50%) fraction of this window length in order to predict the outcome with high probability before the end of the entire window running time and, if necessary, to change the operating mode. As a result, the emissions accumulated in the window are kept below the predetermined limit value, wherein in most cases both reactants (urea) for an SCR catalyst and fuel can be saved. These window results enter the emission control system every second as a guide variable for the emission reserve, which then activates the respectively required operating mode for engine and exhaust gas aftertreatment.

At the same time, the validity of the windows, the performance level, the window length, the window work, the specific $NO_x$ emissions and the average window performance are permanently compared for validation with the required configurable limits and conditions. Only if all of these limits and conditions are met or fulfilled will the calculated emissions window be valid and used for verification. In this case, the total number of non-compliant test windows may not exceed a given proportion of the total windows to ensure that the test passes.

Parallel to the calculation of the main and sub-windows, the window results are evaluated statistically as a basis for assessment and additional guide variable in real time.

The specific NO of the valid windows are then normalized and an adjustable (e.g. 90%) emission value is determined. This statistical evaluation results in an ISC Conformity Factor (ISC=In Service Conformity), the maximum BS $NO_x$ ("break specific": $NO_x$ emissions in g $NO_x$ per kWh), the 90% BS $NO_x$, the number of windows, the maximum window power, as well as a window frequency distribution on the various emission ranges. In the appropriate control device, this information, but primarily the specific $NO_x$, is included as a guide variable. In this case, one can choose between the main window, sub-window or a weighted averaging between these two calculation results. Thereafter, based on a hysteresis, the controller switches the modes of operation between the emission- and operating-resource-optimized calibrations to achieve the best possible fuel economy while still meeting all emission limits. By using these results as a guide variable, the controller can reduce the consumption of operating resources while maintaining the allowable emissions. Since this controller uses an $NO_x$ sensor according to one variant in the exhaust pipe downstream of the exhaust aftertreatment device, the aging of the exhaust aftertreatment device can be compensated by increased use of the engine operating modes with lower emissions and thus the possible duration of use of the entire system can be extended.

According to one variant of the invention, at least one operating parameter and/or operating mode of the internal combustion engine and/or the exhaust aftertreatment device is changed depending on the cumulative specific emissions within the second sub-monitoring window in such a way that at the end of the second monitoring window, the observed cumulative emissions are below a defined threshold for the specific emissions.

In a further variant of the invention, the results of the calculation of the monitoring windows and/or the sub-monitoring windows and the calculated cumulative specific emissions are fed to a statistical evaluation.

A weighting of these emission values is advantageously carried out as a function of the cumulative specific emissions of the monitoring and/or sub-monitoring windows. These are statistically recorded and fed to the respective control variable as an additional guide variable.

Figure 2:
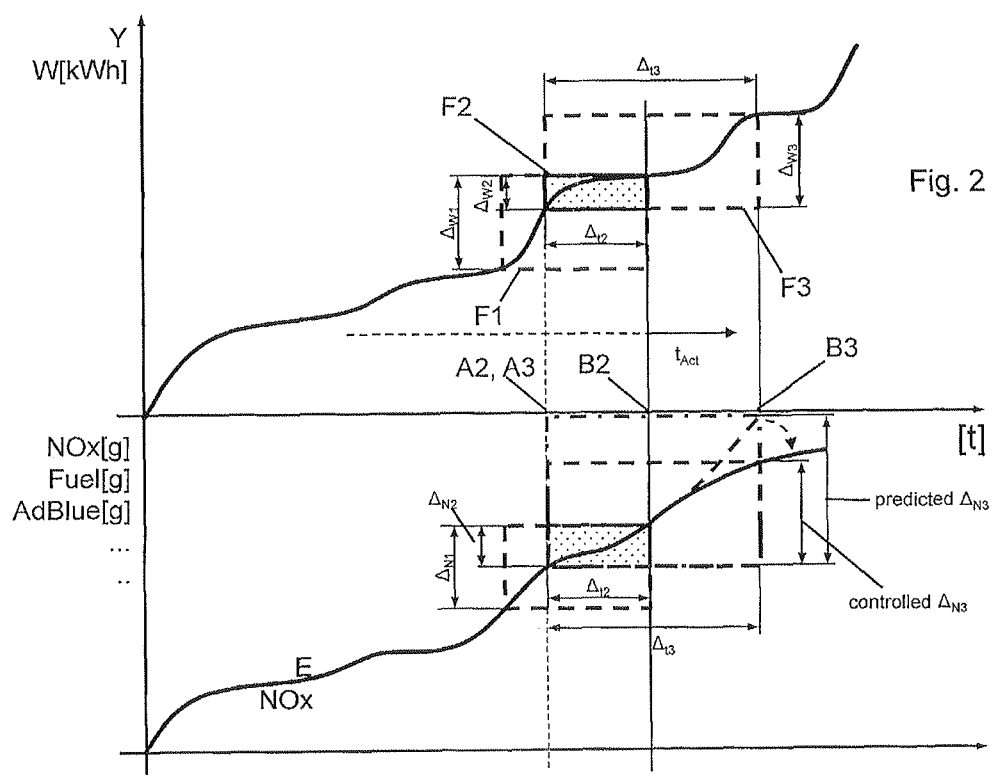
Figure 3:
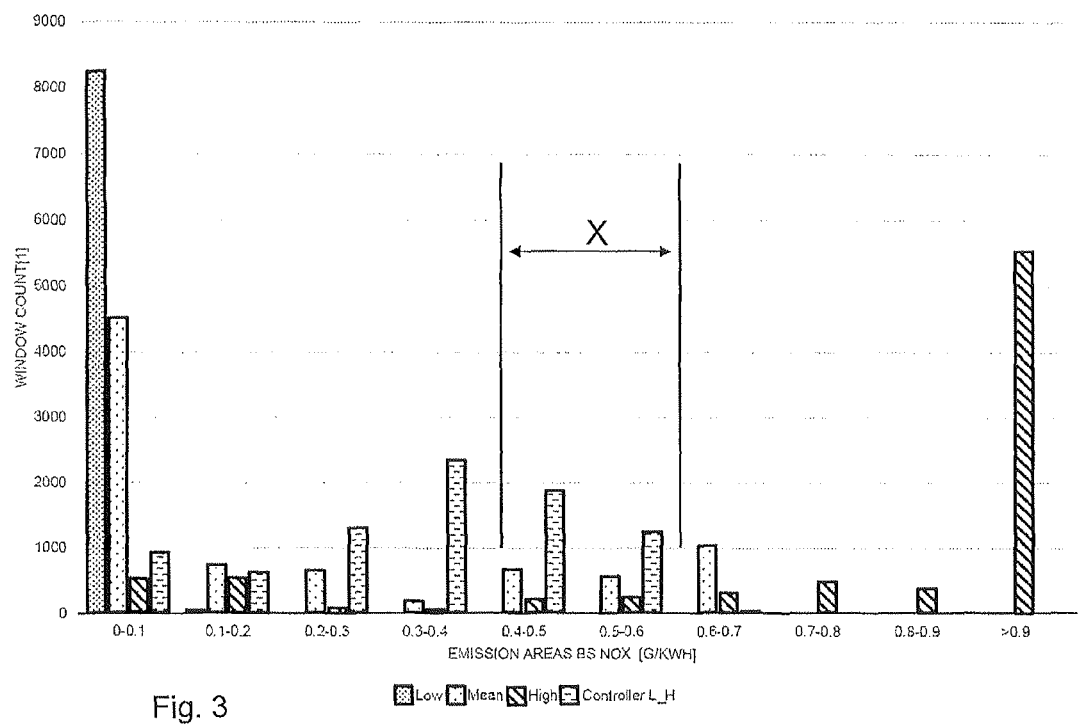

The invention will be explained in more detail below with reference to a non-limiting embodiment, which is illustrated in the figures, wherein:

FIG. 1 and FIG. 2 show exemplary performance and emission profiles of a commercial vehicle during a test cycle by using the method according to the invention; and FIG. 3 shows cumulative measured values in a histogram.

The test cycle represents one of several possible embodiments with regard to applicable cycles. The procedure is equally applicable to commercial vehicles and passenger cars.

In each case, a quantity Y of an observed emission E, for example $NO_x$, of the internal combustion engine of the commercial vehicle is plotted cumulatively over the time t during a test cycle.

As shown in FIGS. 1 and 2, at least one first monitoring window F1 which is moved along the time axis is defined between the beginning and the end of the entire test cycle or other driving operation, wherein each first monitoring window F1 has a specific width $\Delta_{t1}$ and a height $\Delta_{W1}$, wherein the width $\Delta_{t1}$ corresponds to the duration of the driving profile part (starting point to endpoint) within the first monitoring window. The first monitoring window F1 has a first starting point A1 and a first endpoint B1. The height $\Delta_{W1}$ essentially corresponds to the cumulative work and $\Delta_{N1}$ corresponds to the cumulative increase in emissions within the duration of the driving profile part.

Based and depending on at least one externally calculated variable, the width $\Delta_{t1}$ and/or height $\Delta_{W1}$ of each first monitoring window F1 are variably determined or are obtained in a variable manner. These window characteristics $\Delta_{t1}$, $\Delta_{W1}$ can be set or predefined by means of calibration and, alternatively, can also be changed dynamically. The externally calculated variables may be, for example, a cumulative power, cumulative emissions, and/or a cumulative fuel and/or consumption of operating resources. If the width $\Delta_{t1}$ is varied, the height $\Delta_{W1}$ of the first monitoring window also varies in response thereto. If, inversely, the height $\Delta_{W1}$ varies, then the time width $\Delta_{t1}$ of the first monitoring window also changes.

A sub-monitoring window F2 (with partial window starting point A2 and partial window endpoint B2) are further determined within the first monitoring window F1, close to the time $t_{Act}$ with the monitoring window F1, wherein the first monitoring window F1 and the sub-monitoring window F2 can have the same endpoint and the same height $\Delta_{W2}$ (100%). The height $\Delta_{W2}$ and thus the duration of the sub-monitoring window F2 is, however, usually chosen to be substantially lower and can be calibrated from approximately 0% to 50%—in this case approximately 33%—of the first monitoring window F1 (FIG. 2). In variants which are not shown, monitoring and sub-monitoring windows running in parallel and initiated in quick succession are used.

For the height $\Delta_{W3}$ of a second, following monitoring window F3 (with a second starting point A3 and a second endpoint B3), the cumulative emissions are estimated based on the sub-monitoring window F2 and compared with a permissible limit value. If it turns out that the increase in emissions (predicted $\Delta_{N3}$) is greater or too far below this limit value, an emission control parameter intervenes in the control of the internal combustion engine, for example the metered quantity, and the emission control parameters are changed such that the amount of observed emissions—for example $NO_x$ emissions—can be reduced or increased (controlled $\Delta_{N3}$). This ensures compliance with the statutory limit values for the monitoring window (FIG. 2) and optimizes the consumption of operating resources. Thus, based on the intermediate result of the estimation of the cumulative emissions for the sub-monitoring window F2, control is carried out early and in a pre-regulated manner in order to thus not exceed the specified target values subsequently in the second monitoring window F3 and to keep the consumption of operating resources at a minimum. The control device provided for this purpose switches the corresponding operating modes (e.g. optimized for emissions or consumption) and/or the exhaust aftertreatment device as needed. Depending on the cumulative specific emissions E within the sub-monitoring window F2, at least one operating parameter and/or operating mode of the internal combustion engine and/or the exhaust gas aftertreatment device is modified so that at the end of the second time window the observed cumulative emissions are below a defined limit value for the specific emissions.

Both monitoring windows F1 and sub-monitoring windows F2 continue to move further along the time axis t in discrete time steps, as indicated by the arrow $t_{Act}$, wherein the step width $\Delta t_s$ can be calibrated variably. For example, the step width $\Delta t_s$ can amount to one second. In this case, both the widths $\Delta_{t1}$, $\Delta_{t2}$, $\Delta_{t3}$ and the heights $\Delta_{W1}$, $\Delta_{N1}$, $\Delta_{W2}$, $\Delta_{N2}$, $\Delta_{W3}$, $\Delta_{N3}$ of the windows F1, F2, F3 can change constantly. In FIG. 2, for example, two successively calculated monitoring windows F1 and sub-monitoring windows F2 are shown, wherein the end times of two successive monitoring windows F1 are offset by the step width $\Delta t_s$.

The validity of the windows F1, F2, F3 is verified continuously by checking the power levels, the window widths or heights $\Delta_{W1}$, $\Delta_{W2}$, $\Delta_{W3}$, $\Delta_{t1}$, $\Delta_{t2}$, $\Delta_{t3}$ of the windows work (=work output within a sub-monitoring window), the amount of specific emissions and/or the average window power (average value of the power within a sub-monitoring window). In case of an anomaly, the validity of this window is negated and the calculations for new monitoring windows F1, F3 and sub-monitoring windows F2 continue. Valid and invalid windows are statistically recorded or summed. FIG. 3 shows, by way of example, a histogram with summed up valid or invalid windows in different emission ranges. The solution according to the invention allows a movement during the cycle or driving within the optimum or statutorily required limits in the optimum range X.

The invention claimed is:

1. A method for operating an internal combustion engine during a defined cycle, wherein engine raw emissions of the internal combustion engine are adjustable via at least one emission control parameter and wherein the defined cycle has at least one monitoring window (F1, F2, F3) with a starting point (A1, A2, A3) and an endpoint (B1, B2, B3), and the at least one monitoring window includes a first monitoring window (F1) of the cycle defined by a first starting point (A1) and a first endpoint (B1), the method including the following steps:

defining, at the time of the first endpoint (B1), at least one sub-monitoring window (F2) including a partial window starting point (A2) lying before the first endpoint (B1) and a sub-window endpoint (B2) coinciding with the first endpoint (B2), performing a predictive and quantitative estimation of at least one observed emission amount (E) for a second monitoring window (F3) based on the at least one observed emission amount (E) of the at least one sub-monitoring window (F2) before reaching a second endpoint (B3) of the second monitoring window (F3), where a second starting point (A3) lies before the first endpoint (B1), comparing the estimated at least one observed emission amount for the second monitoring window (F3) with a defined maximum emission amount, and upon reaching or exceeding the defined maximum emission amount, adaptively modifying at least one emission control parameter of the internal combustion engine to lower the at least one observed emission amount (E).

2. The method according to claim 1, wherein the estimation of the at least one observed emission amount (E) is dependent on at least one current operating parameter of the internal combustion engine from a group consisting of: engine power, engine speed, torque, engine load, exhaust gas mass flow and concentration of the observed emission value in a tailpipe of an exhaust pipe and an exhaust gas temperature.

3. The method according to claim 2, wherein based on the at least one current operating parameter reaching at least one defined minimum temperature of the internal combustion engine or an exhaust aftertreatment device, after an expiration of a defined time window, at the at least one first monitoring window (F1), and/or the at least one sub-monitoring window (F2) at defined time intervals, calculating in each case an observed cumulative specific emission (E).

4. The method of claim 3, wherein the at least one first monitoring window is more than one of the at least one first monitoring windows (F1, F3).

5. The method according to claim 2, wherein based on the at least one current operating parameter reaching at least one defined minimum temperature of the internal combustion engine or an exhaust aftertreatment device, or after the expiration of a defined time window, calculating an observed cumulative specific emissions (E) within the at least one sub-monitoring window (F2), wherein the sub-monitoring window (F2) is smaller than and within the first monitoring window (F1).

6. The method of claim 5, wherein the sub-window endpoint (B2) of the sub-monitoring window (F2) corresponds to the first endpoint (B1) of the first monitoring window (F1).

7. The method of claim 2, wherein the at least one first monitoring window is more than one of the at least one first monitoring windows (F1, F3).

8. The method according to claim 1, further including the step of continuously checking a validity of the at least one monitoring windows (F1, F3) by checking one or more of the group consisting of: power level values, window width ($\Delta_{t1}$), window work, amount of specific emissions (E), average window power and the validity of the at least one monitoring window is negated in an abnormality event, and calculations for new monitoring windows and/or sub-monitoring windows is continued.

9. The method according to claim 8, wherein a number of abnormal and non-abnormal monitoring windows is recorded statistically.

10. The method according to claim 1, wherein the at least one emission control parameter of the internal combustion engine is further adaptively modified to adjust a cumulative value (Y) for the amount of the observed emission (E) below a defined limit value at an endpoint of the second monitoring window (F3).

11. The method according to claim 1, wherein the emission control parameter controls at least one of the group consisting of: an exhaust gas recirculation rate of an internal or external exhaust gas recirculation system, a metered amount of reducing agent or fuel, an injection amount of reducing agent or fuel, an air mass, an injection timing, a rail pressure of an injection system, a metering for an existing exhaust aftertreatment system.

12. The method according to claim 1, wherein depending on an observed cumulative specific emission (E) within the sub-monitoring window (F2) at least one operating parameter and/or operating mode of the internal combustion engine and/or the exhaust aftertreatment device is modified in such a way that at the end of the second monitoring window (F3) the observed cumulative emissions are below a defined limit for the specific emissions.

13. The method according to claim 1, wherein the results of the calculation of the monitoring windows (F1, F3) and/or the sub-monitoring windows (F2) and a calculated cumulative specific emission (E) is fed to a statistical evaluation.

14. The method according to claim 1, wherein depending on a cumulative specific emission (E) of the monitoring windows (F1, F3) and/or sub-monitoring windows (F2), a weighting of emission values is performed, statistically recorded and supplied to a respective control variable as an additional guide variable.

15. The method according to claim 1, wherein $NO_x$ and/or $CO_2$ emissions are the at least one observed emission.

* * * * *